(12) United States Patent
Fujii

(10) Patent No.: US 12,271,679 B2
(45) Date of Patent: Apr. 8, 2025

(54) COMPUTER READABLE MEDIUM, INFORMATION PROCESSING APPARATUS AND INFORMATION PROCESSING METHOD

(71) Applicant: FUJIFILM Business Innovation Corp., Tokyo (JP)

(72) Inventor: Toshihide Fujii, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 694 days.

(21) Appl. No.: 17/405,444

(22) Filed: Aug. 18, 2021

(65) Prior Publication Data

US 2022/0335202 A1 Oct. 20, 2022

(30) Foreign Application Priority Data

Apr. 14, 2021 (JP) .................................. 2021-068175

(51) Int. Cl.
*G06F 40/103* (2020.01)
*G06F 40/169* (2020.01)

(52) U.S. Cl.
CPC .......... *G06F 40/103* (2020.01); *G06F 40/169* (2020.01)

(58) Field of Classification Search
CPC ...... G06F 40/103; G06F 40/169; G06F 16/93; G06F 40/151
See application file for complete search history.

(56) References Cited

U.S. PATENT DOCUMENTS

| 5,831,617 A | * | 11/1998 | Bhukhanwala | ..... G06F 3/04817 715/977 |
| 2004/0189695 A1 | * | 9/2004 | Kurtz | ..................... G06F 16/168 715/738 |
| 2009/0307622 A1 | * | 12/2009 | Jalon | ...................... G06F 3/0482 715/765 |
| 2012/0137215 A1 | | 5/2012 | Kawara | |
| 2012/0278706 A1 | * | 11/2012 | Fuse | ...................... G06F 40/123 715/255 |
| 2014/0354851 A1 | | 12/2014 | Yasuoka | |

FOREIGN PATENT DOCUMENTS

| JP | H10-124489 A | 5/1998 |
| JP | 4350981 B2 | 10/2009 |
| JP | 5725812 B2 | 5/2015 |

OTHER PUBLICATIONS

Feb. 22, 2022 Extended European Search Report issued in Patent Application No. 21195577.8.

(Continued)

*Primary Examiner* — Andrey Belousov
(74) *Attorney, Agent, or Firm* — Oliff PLC

(57) ABSTRACT

A non-transitory computer readable medium storing a program causes a computer to execute a process, the process including: obtaining a file of a first format on which specific processing cannot be executed; generating a file of a second format on which the specific processing is executable based on the obtained file of the first format before execution of the specific processing is instructed; and executing the specific processing on the generated file of the second format in response to an instruction to a first image representing the file of the first format to execute the specific processing.

17 Claims, 11 Drawing Sheets

(56) References Cited

OTHER PUBLICATIONS

Apr. 2, 2024 Office Action issued in European Patent Application No. 21195577.8.
May 22, 2023 Office Action issued in European Patent Application No. 211955778-1203.
May 10, 2022 Office Action issued in Japanese Patent Application No. 2021-068175.
Nov. 14, 2024 Decision to Refuse issued in European Patent Application No. 21195577.8.
Nov. 13, 2024 Minutes of the Oral Proceedings issued in European Patent Application No. 21195577.8.
Anonymous, "Combine PDF", <https://web.archive.org/web/20210413085057/https://combinepdf.com/>, Apr. 13, 2021.

* cited by examiner

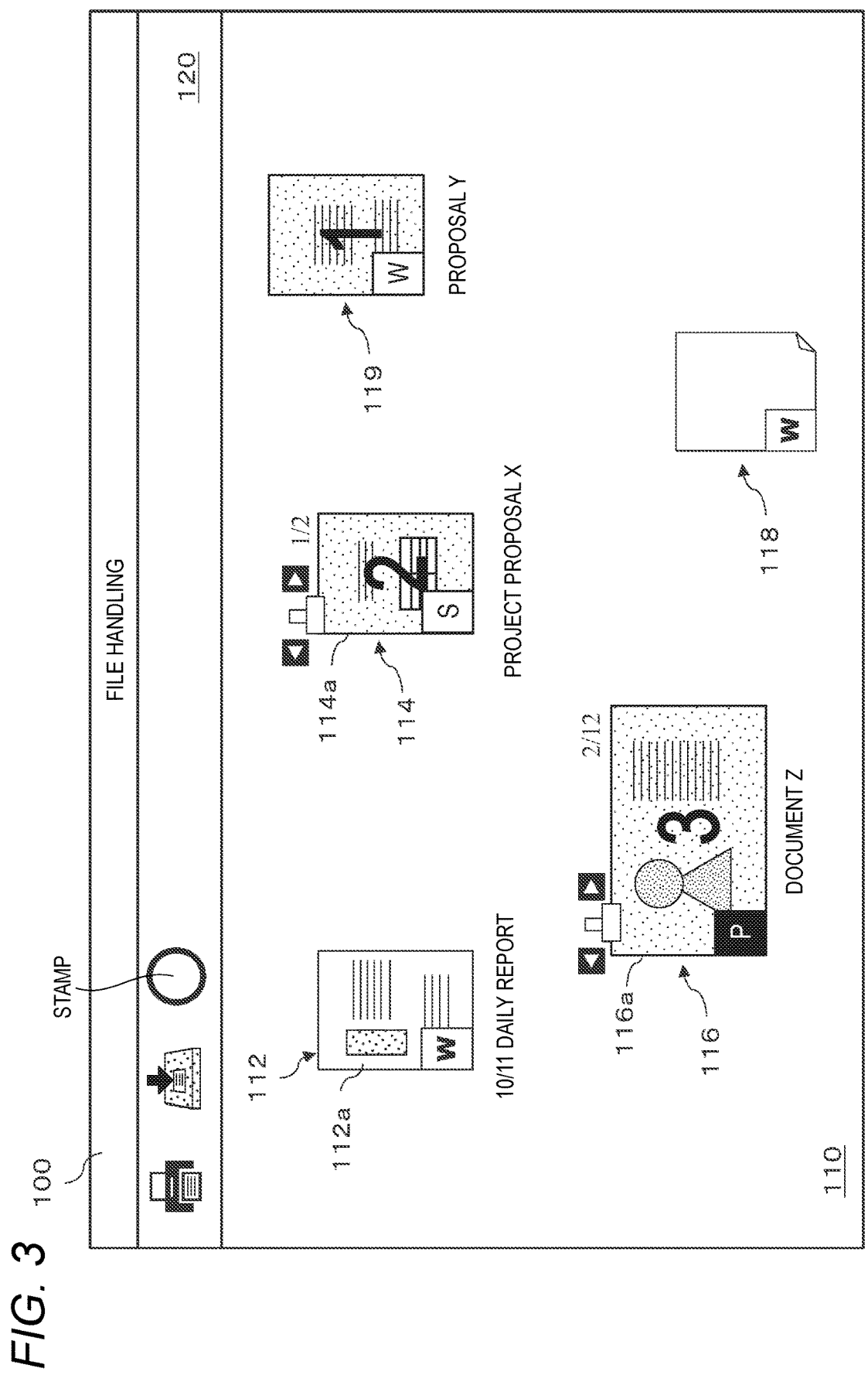

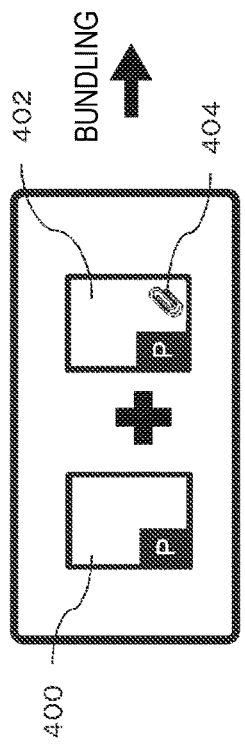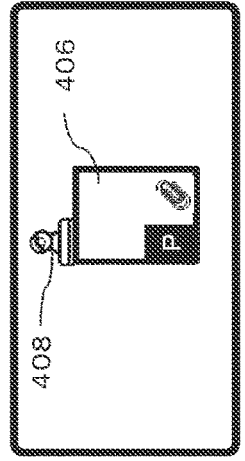
FIG. 4A
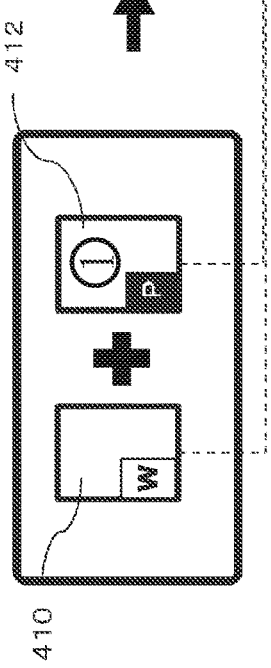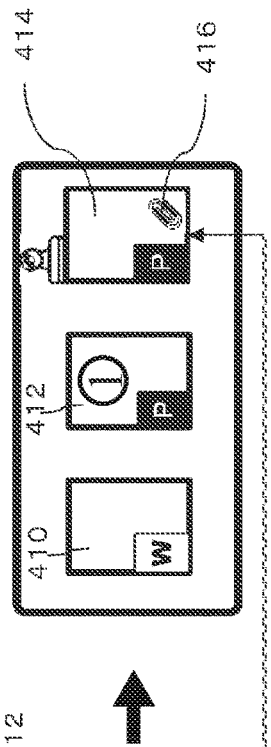
FIG. 4B
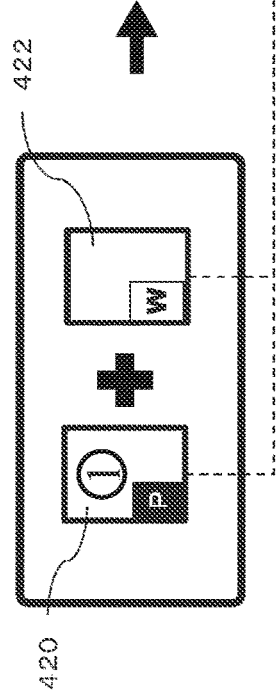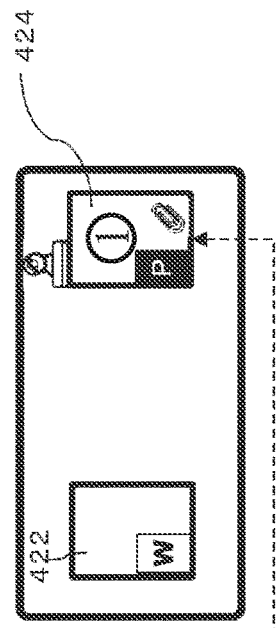
FIG. 4C
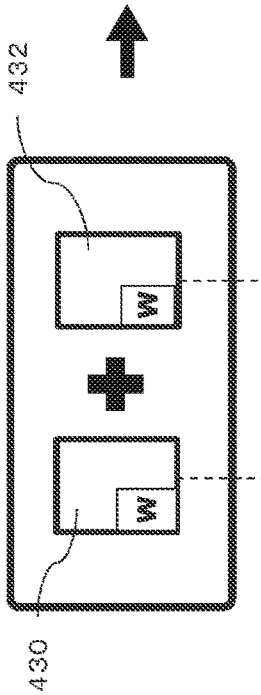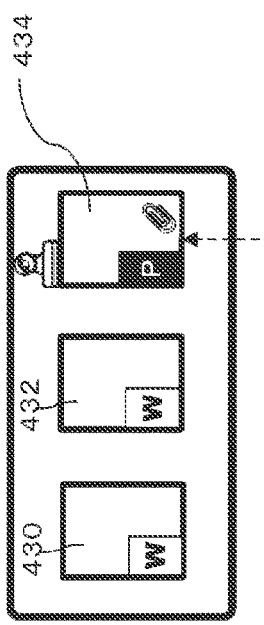
FIG. 4D

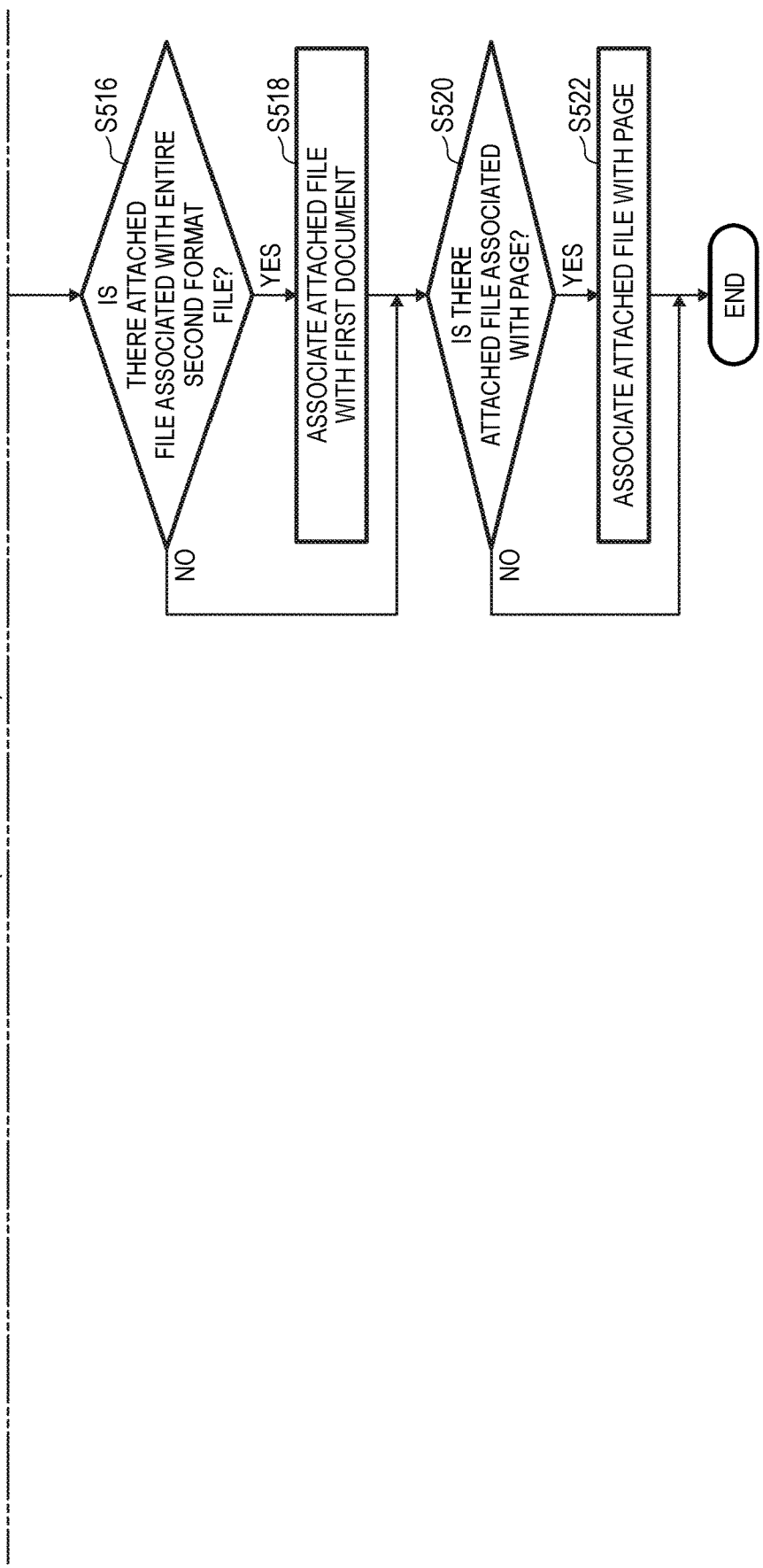
(FIG.5 Continued)

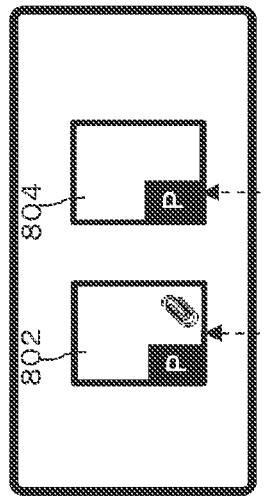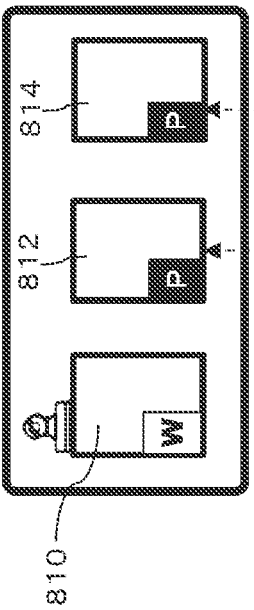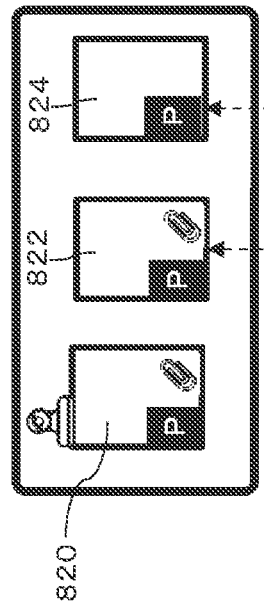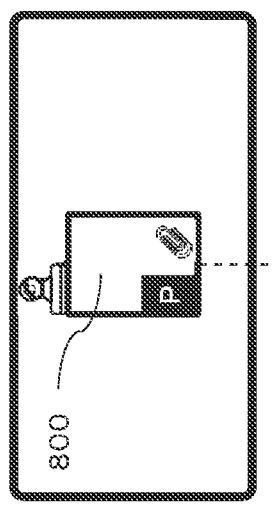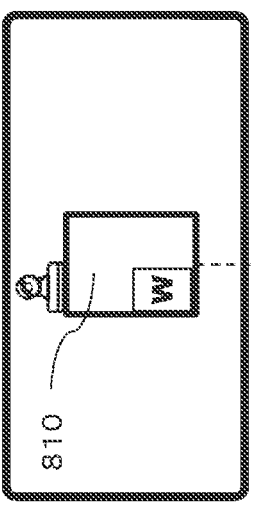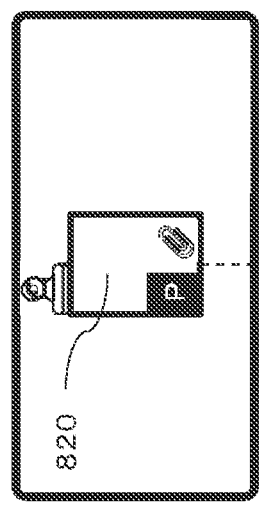
*FIG. 8A*  *FIG. 8B*  *FIG. 8C*

COMPUTER READABLE MEDIUM, INFORMATION PROCESSING APPARATUS AND INFORMATION PROCESSING METHOD

CROSS-REFERENCE TO RELATED APPLICATIONS

This application is based on and claims priority under 35 USC 119 from Japanese Patent Application No. 2021-068175 filed on Apr. 14, 2021.

BACKGROUND

Technical Field

The present invention relates to a computer readable medium storing a program, an information processing apparatus, and an information processing method.

Related Art

There is software that manages image data read by a scanner and document files generated by an application on a personal computer (PC). File handling software such as DocuWorks (trademark) provided by the applicant and AdobeAcrobat (trademark) of AdobeSystems, Inc. are examples. This type of software (hereinafter simply referred to as "software") is configured to obtain and handle files of image data (for example, JPEG format) obtained by scanning paper documents and application files generated by various applications such as word processors and spreadsheets.

This type of file handling software manages files with different data formats generated by various applications by converting these files into a data format described in a language that defines an appearance of a page, that is, a page image, such as a page description language.

Further, this type of file handling software has information indicating an image of each page in a document, for example, as disclosed in JP-A-H10-124489, and therefore has a "bundling" function and a "disassembling" function. The bundling function is a function of synthesizing plural documents to generate one document. Pages of files generated by different applications, such as word processor files and spreadsheet files can also be bundled by using the bundling function. Further, the disassembling function is a function of dividing one document into plural documents on a page-by-page basis.

Applications such as word processors generally do not have a bundling function or a disassembling function for files generated by the applications. As a method of bundling or disassembling a file generated by an application that does not have the bundling function or the like, there is a method of incorporating the file into the above handling software. For example, a document represented by a word format file generated by word processor software "Word" of Microsoft is converted to a PDF format, and the document in the PDF format is disassembled page by page by DocuWorks or Acrobat.

Not limited to the handling software examples described above, in order to implement processing that cannot be executed on a file of a certain data format, a method, which converts the file into a data format handled by an application that can process the file, is always adopted.

Further, a default application for opening and handling each data format (that is, a format) is set in an operating system (OS). In a graphical user interface (GUI) of the OS, a file is always displayed with an icon indicating a data format of the file.

That is, when an icon indicating a file of a certain data format (called a first format) is opened by a double-click operation or the like, a first application associated with the first format is started and the file is opened by the first application. When the file is converted into another second format, the converted file is displayed with a second format icon indicating the second format, and when an operation of opening the second format icon is performed, a second application associated with the second format is started.

Then, as in the example of the bundling function of the above word processor file and the handling software, there is specific processing that cannot be executed by the first application but can be executed by the second application.

Further, Japanese Patent No. 4350981 discloses a technique in which when a content file is distributed, in order to distribute the file in a format that matches a distribution destination environment (which format is supported), the content file and conversion instruction information for converting the format of the content file to another format are combined (encapsulated) as a single document.

Japanese Patent No. 5725812 discloses an apparatus that converts an input file into a PDF if the file is a file in a format other than PDF. When the input file is PDF and the other file is attached, the apparatus combines the input PDF file and the attached PDF file if the other file is PDF, and if the other file is not PDF, the attached file is converted into PDF, and the apparatus combines the attached file and the input PDF file, converts the combined PDF file into page description language data, and prints the page description language data.

SUMMARY

There is specific processing that cannot be executed on the first format file, but is executable on the second format file. In a case where the specific processing is to be performed on a file when a first image such as an icon representing the first format file is displayed, it is necessary to generate the second format file from a time when the execution of the specific processing is instructed and execute the specific processing on the generated file, which takes time.

Aspects of non-limiting embodiments of the present disclosure relate to executing specific processing faster than the processing of generating a second format file after instructing the execution of the specific processing in a case where the specific processing is to be performed on the file when a first image representing a first format file is displayed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a non-transitory computer readable medium storing a program causing a computer to execute a process, the process including: obtaining a file of a first format on which specific processing cannot be executed; generating a file of a second format on which the specific processing is executable based on the obtained file of the first format before execution of the specific processing is instructed; and executing the specific processing on the generated file of the second format in response to an instruction to a first image representing the file of the first format to execute the specific processing.

BRIEF DESCRIPTION OF THE DRAWINGS

Exemplary embodiment(s) of the present invention will be described in detail based on the following figures, wherein:

FIG. 3 is a diagram illustrating a state in which icons of documents to be processed are sequentially selected on the handling screen;

FIGS. 4A, 4B, 4C, and 4D are diagrams illustrating four typical patterns of bundling processing;

FIGS. 8A, 8B, and 8C are diagrams illustrating three typical patterns of disassembling processing;

DETAILED DESCRIPTION

Figure 1:
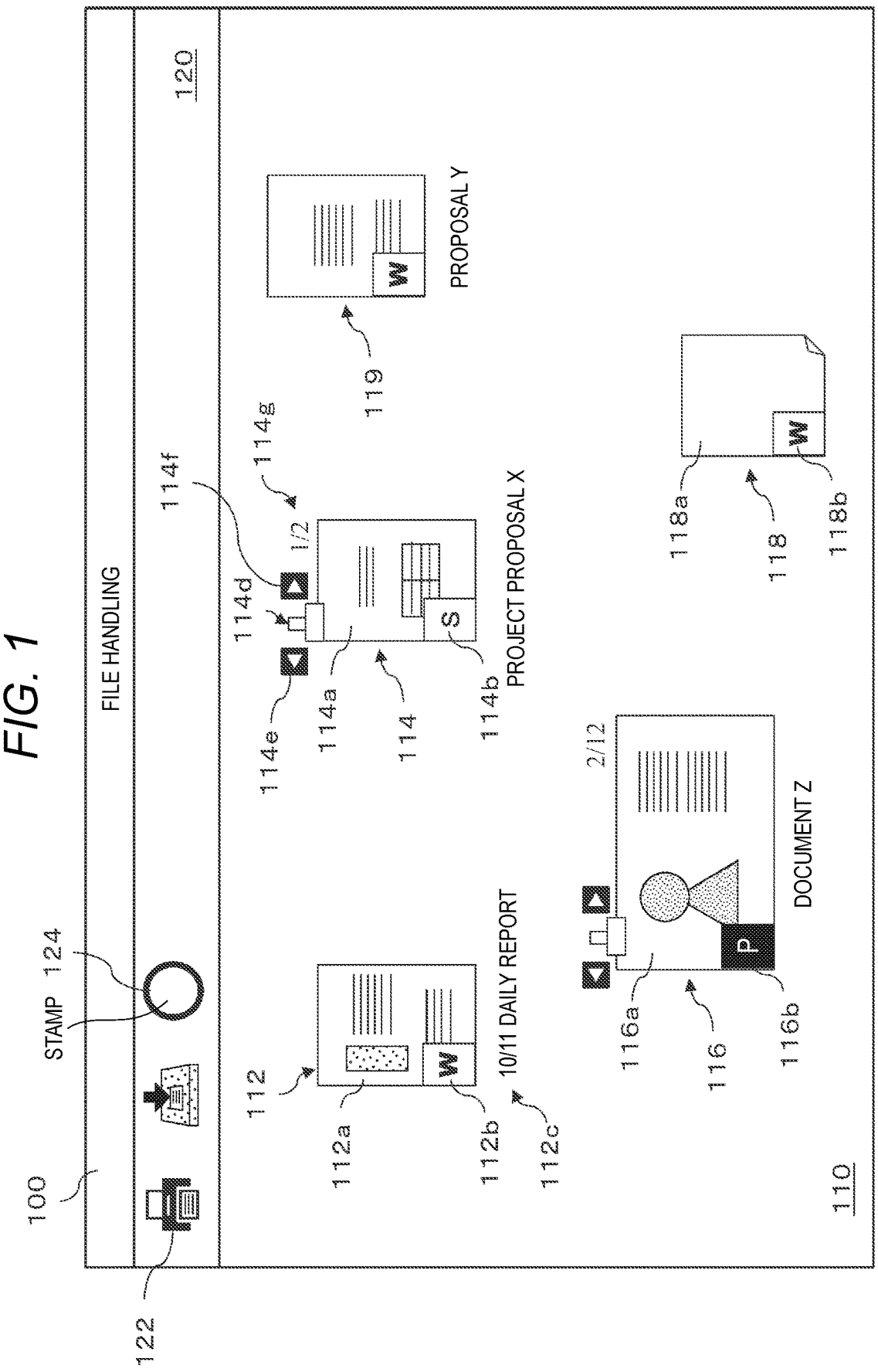
FIG. 1 is a diagram illustrating a handling screen provided by an information processing apparatus.

Hereinafter, exemplary embodiments for implementing the invention will be described with reference to the drawings. Hereinafter, an exemplary embodiment of an information processing apparatus having a file handling function for displaying contents of electronic data files to a user and processing those files in response to an operation of the user will be described.

<File Handling Function>

The information processing apparatus of the present exemplary embodiment obtains and handles a file generated by application software such as a word processor, a file representing image data generated by a scanner, a digital camera, or the like. The information processing apparatus converts the obtained file into a file in a data format for handling and manages the file. The data format for the handling describes an image of each page of a document indicated by the file, and examples thereof include a portable description format (PDF) and an xdw format used in the above DocuWorks. In an example shown below, the information processing apparatus uses the PDF format as the data format for handling. In the following, a file may be referred to as a document.

Further, in the following, the data format of the file that the information processing apparatus obtains from the application or the like is referred to as an original format or a first format. On the other hand, the data format of the file used by the information processing apparatus for handling is referred to as a handling format or a second format. For example, the word format of Microsoft is an example of the first format, and the PDF format is an example of the second format. The second format can also be said to be an internal data format used by the information processing apparatus to execute the handling processing peculiar to the device. The second format file includes data that describes an image content of each page, the number of pages of the document indicated by the file may be obtained and displayed from the data, and any page in the document may be opened and displayed as a paper book. The xdw format is also a data format that describes an image of each page of the document, but for example, when the information processing apparatus uses the PDF format as the handling format, that is, the second format, the xdw format corresponds to the first format. That is, when a file in the xdw format is imported into the information processing apparatus from the outside, the information processing apparatus converts the file into the PDF format, which is the second format, and uses the second format for the handling processing.

The information processing apparatus has a function of executing various handling processing such as bundling, disassembling, and annotation.

The bundling processing is processing of synthesizing plural files to generate one file, and is also referred to as synthesizing processing. For example, when a first file having 10 pages and a second file having 5 pages are bundled in this order by the bundling processing, from the beginning, the 10 pages of the first file are arranged in order, and then the 5 pages of the second file are arranged in order to generate a third file. The generated third file is stored as a new file different from both the first file and the second file, or is overwritten and stored in the first file, in response to setting information set in the information processing apparatus. A setting may be prepared such that the third file is overwritten and stored in the second file instead of the first file.

The disassembling processing is processing of dividing one file to generate plural files, and is also referred to as dividing processing. For example, if a file having 10 pages is divided into 2 pages in order from the first page by the disassembling processing, 5 files each including 2 pages are generated.

The annotation processing is processing of accepting input of an annotation from a user for a content (for example, a paragraph or a character string) or a place in a page included in the file, and associating data of the annotation with the content or the place. When the information processing apparatus displays the page, the annotation associated with the content or the place in the page is displayed, for example, in a form of a sticky note or a pop-up corresponding to the content or the place.

Each of these bundling processing, disassembling processing, and annotation processing executed by the information processing apparatus is processing that is executable on a file in the handling format, that is, the second format used by the information processing apparatus. Each of these processing cannot be executed on a file in the original format, that is, in the first format before being imported into the information processing apparatus. As described above, the specific processing that cannot be executed on the first format file but is executable on the second format file is referred to as "specific processing".

Further, "the specific processing cannot be executed (for a file in a certain data format)" means that the specific processing cannot be executed with the original data format as it is. This concept includes a case where the application that handles the data format does not have the function of executing the specific processing. Further, this concept also includes a case where when the specific processing is executed by some application on the file in the data format, a result of the processing is not the data format but another data format.

For example, the application "Word" that handles the file in the word format of Microsoft, which is an example of the first format, does not have the function of bundling or disassembling page by page. Therefore, when the specific processing such as bundling or disassembling is to be performed on a file in the word format, the file is imported into the information processing apparatus and converted into the second format such as a PDF format, and the specific processing is executed on the second format file.

The information processing apparatus obtains the first format file and generates the second format file. Then, in the present exemplary embodiment, the information processing apparatus stores the imported first format file and the second format file generated from the file in association with each other. The method of this association is not limited. The internal format of the document in the information processing apparatus may be any format as long as two files, the first format file and the second format file of the document, may be included in association with an image, that is, an icon representing the document. For example, the internal format may include both the first format file and the second format file in one internal format file. Further, the internal format may store the first format file and the second format file generated from the file separately, and may generate and store management information in which a fact that the two files correspond to each other is recorded. When the file imported from the outside into the information processing apparatus is in the first format, the internal format file in the information processing apparatus, that is, the document includes both the first format file and the second format file generated from the file. Further, when the file imported from the outside is in the second format, the internal format file includes the second format file.

As described above, contents of the internal format file differ depending on whether the file is generated when the first format file is imported or when the second file is imported. Therefore, on a handling screen 100 described later, an image content of an icon representing the file is distinguished depending on whether the internal format file is derived from the first format file or the second format file. For example, as will be described later, when the file is derived from the first format file, a mark 112b or the like representing the first format may be displayed on an icon 112 or the like. The information processing apparatus handles the icon 112 or the like representing the internal format file derived from the first format file as the internal format file representing the first format file.

The internal format file, for example, header information of the file may have information indicating whether the internal format file is derived from the first format file or the second format file. Further, the internal format file derived from the first format file may include information indicating an application data format of the first format into, for example, the header information. Then, the image content of the icon displayed on the handling screen 100 may be switched according to distinction information thereof or information indicating the application.

Further, as another example, when the information processing apparatus obtains the second format file, the information processing apparatus may store the file as it is. That is, in this example, when the second format file is imported, the second format file is stored as it is, not as the internal format file. An internal format file is generated when the first format file is imported. In this example, the information processing apparatus may determine that the internal format file is derived from the first format, and may recognize the second format file as a second format file as it is.

As will be described later, the second format, for example, PDF, is a format to which other files is attachable. Therefore, there is a second format file to which a first format file is attached. On the other hand, the internal format of the file in the information processing apparatus of the present exemplary embodiment is different from the second format, and the two can be clearly distinguished from each other.

That is, when the first format file is imported, the internal format file generated by the information processing apparatus is the same as the second format file to which the first format file is attached, in that the internal format file includes data contents of both the first format file and the second format file generated from the first format file. However, the internal format file and the second format file with the attached file are distinguished as files having different formats by, for example, the header information of the file. Then, the information processing apparatus sets the icon 112 or the like representing the internal format file generated from the first format file to an image content different from an icon (for example, an icon representing a document 402 in FIG. 4A described later) representing the second format file to which a file is attached.

<Description of User Interface (UI) Screen>

FIG. 1 illustrates the handling screen 100 displayed by an information processing apparatus as a UI screen. The illustrated handling screen 100 includes a workspace region 110 and an operation button region 120.

The workspace region 110 is a kind of desktop screen on which icons 112, 114, 116, . . . of a file that the user tries to manage are arranged. For example, the user generates the workspace region 110 for each task which the user is performing, and places and manages a group of files such as documents used in the task in the workspace region 110. The workspace region 110 shown in FIG. 1 is one of the one or more workspace regions 110 which may be generated by the above method.

Icons 112, 114, 116, 118, and 119 (hereinafter, collectively referred to as the "icon 112 or the like" when there is no need to distinguish) representing the files to be handled are displayed in the workspace region 110.

The icon 112 includes a thumbnail image 112a of a page of the corresponding file, the mark 112b representing a data format of the file, and a file name 112c of the file. The file represented by the icon 112 is a file in the data format of the word processor software, and the mark 112b is designed to represent the data format. The mark 112b is displayed at a predetermined position (lower left corner in the illustrated example) in the thumbnail image 112a so as to be superimposed on the thumbnail image 112a.

As long as the icon 112 is imported into the information processing apparatus and displayed on the handling screen 100, a file in the handling format, that is, the second format (PDF format in this example) corresponding to the file is also generated, and is stored in the information processing apparatus in association with the icon 112. A content of the document represented by the second format file (that is, an image of each page of the document) is the same as a content of the document represented by the corresponding first format file. In the example of the icon 112, the data format of the word processor software is the first format. The file represented by the icon 112 is a document of only one page, and the thumbnail image 112a is a reduced image of the page.

The thumbnail image 112a is generated based on data of the second format file stored in association with the icon 112. That is, the file includes data that describes an image of one page, and the thumbnail image 112a of the page is generated based on the data and displayed as an image of the icon 112.

A file represented by the icon 114 is a document having two pages. The file is a file in the data format of spreadsheet software, and a mark 114b indicates the data format. A clip-shaped mark 114d shown at an upper portion of the icon 114 indicates that the file includes plural pages. A page return mark 114e is displayed on a left side, and a page feed mark 114f is displayed on a right side of the clip-shaped mark 114d. These marks 114e and 114f are used for an operation of turning the page indicated by the thumbnail image 114a in the icon 114. Further, a page number 114g is displayed on an upper portion of the thumbnail image 114a. The page number 114g indicates a page number of the displayed thumbnail image 114a. In the illustrated example, the thumbnail image 114a is shown to be the first page of the file having two pages. The information processing apparatus stores not only the file in the data format of the spreadsheet software, which is the first format, but also the second format (PDF format in this example) file generated from the file in association with the icon 114. The thumbnail image 114a of each page included in the icon 114 is generated based on the data of each page included in the second format file. In one example, the thumbnail images of each page may be collectively generated, for example, when the files are imported into the information processing apparatus, and may be stored in the information processing apparatus in association with the second format file. As another example, the information processing apparatus synchronizes with the operation of turning the page to be displayed on the icon 114 in response to pressing of the mark 114e or 114f, and the thumbnail image 114a of the page to be newly displayed may be dynamically generated based on the data of the page in the second format file.

Since the thumbnail image 114a is generated from the second format file that describes the image of the page, it is possible to turn the page of the thumbnail image 114a and display the page number 114g in the display of the icon 114. For example, in a case where the thumbnail image of each page is generated in advance (for example, when the file is imported) and is not stored in the information processing apparatus, when the thumbnail image of the page is displayed, the thumbnail image may be dynamically and quickly generated from the second format file. If there is only a first format file, a total number of pages cannot be known unless the first format file is opened by an application in the first format. Further, it is not practical to start the application in the first format in order to dynamically generate the thumbnail image.

A file represented by the icon 116 is data of a document having 12 pages, and the data format is the PDF format which is the second format. The file is generated by an external application that may edit the PDF file, or is generated by the information processing apparatus as a result of specific processing such as bundling processing or disassembling processing. There is no first format file having the same document content in the file. That is, the icon 116 is not associated with the first format file having the same document content as the file to which the second format file is associated.

The icons 112, 114, 116, and 119 are displayed as images having a size proportional to a page size of a document represented by the corresponding file. In the illustrated example, the icons 112, 114, and 119 represent A4 size pages, whereas the icon 116 represents an A3 size page.

The icon 118 is an icon displayed to represent a file after a file import operation is performed on the information processing apparatus until page data of the second format is generated. Since the thumbnail image of the page cannot be generated until the page data of the second format is generated, the icon 118 includes not the thumbnail image but the image prepared in advance indicating the data format of the file. Such the icon 118 is displayed in the workspace region 110 when the handling processing (for example, the above specific processing such as bundling processing, or movement of a position of an icon in the workspace region 110) may be executed on the file in response to the import operation. Then, when the page data of the file is generated and the thumbnail image may be displayed, the icon is changed to an icon including a thumbnail image similar to those of the icons 112 and 114.

Here, an example in which the icon 112 or the like includes the thumbnail image 112a or the like has been described, but the example is only an example. Of the processing in the present exemplary embodiment described below, the processing that does not use the thumbnail image 112a or the like may be applied to a case where the icon that does not include the thumbnail image 112a or the like is used.

The icons 112, 114, . . . in the workspace region 110 may be moved to any position in the workspace region 110 by, for example, a drag-and-drop operation with a mouse.

In the operation button region 120, GUI buttons, which are pressed by the user to instruct various processing on the files represented by the icons 112, 114, . . . displayed in the workspace region 110, are displayed. For example, a print button 122 is a button for instructing printing. After the user selects, for example, the icons 112, 114, . . . of one or more files in the workspace region 110 by a click operation or the like, the print button 122 is pressed (for example, clicked). In response to the operation, the information processing apparatus executes processing of printing the file represented by the icon 112 or the like in the selected state. Further, an approval stamp button 124 is a button for instructing processing of stamping an approval stamp of the user at a predetermined place on a predetermined page of the selected document. The stamping of the approval stamp is performed by superimposing an image of an imprint on the approval stamp, which is stored in advance at the predetermined place on the predetermined page of the second format file of the document corresponding to the selected icon, by the annotation function of the information processing apparatus. Stamping processing indicated by the approval stamp button 124 is processing for data in the second format, and cannot be executed for data in the first format such as a word processor document which is a source of the processing. That is, the stamping processing is an example of the specific processing.

Further, although not shown, a button for instructing bundling processing or disassembling processing, which is a typical example of the specific processing illustrated above, may be disposed in the operation button region 120.

Importing or uploading of a file from the outside to the information processing apparatus is instructed, by, for example, dropping an icon of the file displayed on a desktop screen or a file system screen of an OS into the workspace region 110 by the drag-and-drop operation. The information processing apparatus is configured by executing file handling software on the OS, and each folder displayed on the desktop screen of the OS and the file system screen of the OS is external to the information processing apparatus. In addition to the above, there are other methods such as a method of instructing file import from a menu (not shown) in the handling screen 100.

When import of a file is instructed by the method, if the file is in the second format (that is, PDF in this example), the information processing apparatus simply associates the file with an instructed import destination and stores the file. For example, when a file is dropped into the workspace region 110, the file is associated with the workspace region 110 and stored. Also, when import of a file in a format other than the second format (that is, the first format) is instructed, the information processing apparatus generates a second format file from the file, stores the generated second format file in association with the first format file, and manages the file.

<Generation Timing of Second Format>

In the present exemplary embodiment, typically, when a first format file is imported into the information processing apparatus from the outside, a second format file is generated from the first format file. However, a timing at which the second format file is generated is not limited thereto. The second format file may be generated at any timing as long as after the instruction is performed to import the first format file into the information processing apparatus and before the user instructs the information processing apparatus to execute the specific processing for the icon 112 or the like representing the file.

<Operation for Icon of File>

The icons 112, 114, 116, and 119 primarily represent a first format file stored in association with the icons. That is, the icons 112, 114, 116 and 119 are examples of the first image representing the first format file. When the user performs an operation instructing the icons 112, 114, 116, and 119 as the first image to execute basic processing such as opening a file, the information processing apparatus executes the operation on the first format file corresponding to the first image. For example, when the icon 112 is instructed to execute the file open processing by double-clicking or selecting "open" in a context menu, the information processing apparatus executes the processing of opening the file in the first format (a data format of the word processor software in this example) stored corresponding to the icon 112. In addition to the above, processing of extracting or downloading a file from the information processing apparatus (that is, the file handling software) to the outside also corresponds to such the basic processing. These basic processing is processing that may be executed even on the first format file, and is an example of another processing that is different from the specific processing.

On the other hand, the user may instruct the above specific processing on the icons 112, 114, 118, and 119 representing the first format file. In this case, the information processing apparatus executes the specific processing not on the first format file but on the second format file stored in association with the first format file. For example, when the execution of the bundling processing of bundling two files represented by the icons 112 and 114 is instructed, the information processing apparatus executes the bundling processing on the two second format files corresponding to those two icons. As described above, the instruction of executing the specific processing on the first image, that is, the icons 112, 114, 118, and 119 is an instruction given by an operation performed by the user using the GUI with respect to the first image in the workspace region 110. The operation of the instruction to execute the specific processing by using the GUI includes selecting of the context menu in a state where the first image is selected, an operation of dragging the first image and dropping the first image on an icon of another file, operation of dragging the icon of another file and dropping the icon on the first image, or the like.

The icon 116 represents the second format file, and is not the corresponding first format file. The icon 116 is an example of a second image representing the second format file. The information processing apparatus accepts an instruction to execute processing on the icon 116 as an instruction to execute either the basic processing or the specific processing on the second format file. For example, when an open operation is performed on the icon 116, the information processing apparatus opens the second format file associated with the icon 116, and when an operation of disassembling processing is performed, the disassembling processing is performed on the second format file.

The information processing apparatus does not display the icon representing the second image, that is, the second format file, for the document displaying the icon 112 or the like representing the first image, that is, the first format file. That is, such a document includes both the first format file and the second format file as an internal format. However, the mark 112b or the like representing the first format is displayed on the icon 112 or the like representing the document, but the mark (for example, the same as the mark 116b) representing the second format is not displayed. Further, the icon representing the second format is not displayed separately from the icon representing the first format. Accordingly, the user recognizes that there is only one icon 112 or the like representing the first format file for the document in the workspace region 110. If different icons are displayed for each data format for one document, the user needs to select different icons depending on whether the processing to be executed is the specific processing. On the other hand, in the present exemplary embodiment, since only one icon is displayed for the document, there is no complexity of selecting different icons depending on whether the processing is the specific processing.

Figure 2:
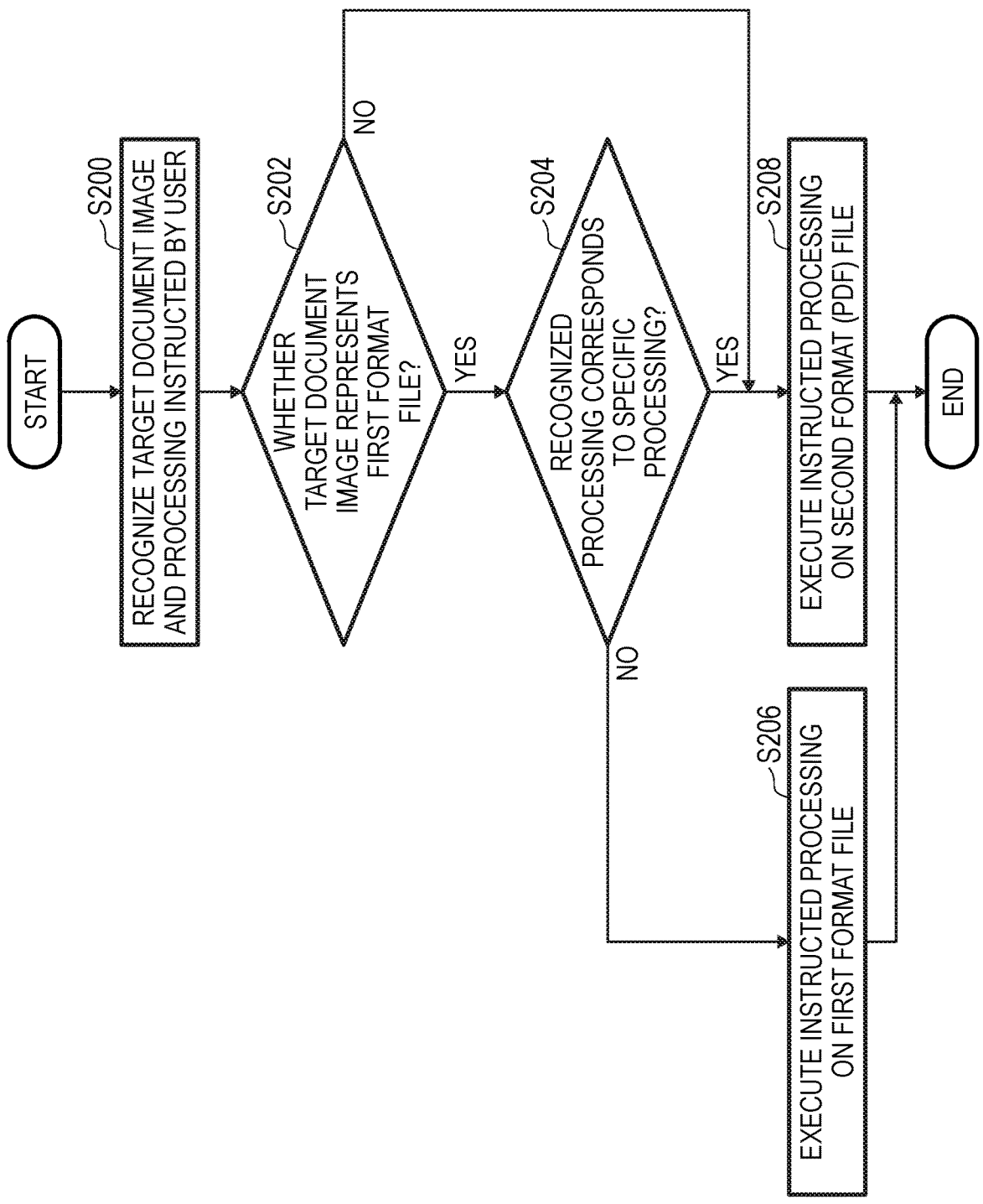
FIG. 2 is a diagram illustrating a processing procedure when a processing execution instruction is received for a document icon in the handling screen.

FIG. 2 illustrates an overall processing procedure of the information processing apparatus when the user operates the icon 112 or the like in the workspace region 110.

In this procedure, the information processing apparatus first recognizes a target document image which is a target of the operation and the processing that the user has instructed to execute by the operation (step 200). The target document image is the icon 112 or the like selected by the user as an operation target by, for example, a mouse click operation or the like. Further, the processing instructed to be executed by the user is, for example, processing selected by the user from the menu of the handling screen 100 or the button of the operation button region 120, the context menu called from the icon 112, or the like. That is, the user instructs the target document image to execute the processing for the corresponding document by operating the icon 112 or the like as the target document image. Further, the information processing apparatus may recognize the instruction of the user from a gesture for the icon. For example, double-clicking on an icon may be recognized as an execution instruction of processing of opening a document corresponding to the icon, and an operation of dragging an icon and dropping the icon on another icon may be recognized as an execution instruction of processing of bundling two documents represented by those icons. When the target document image is the first image representing the first format file, a file corresponding to the target document image includes the first format file and the second format file.

Next, the information processing apparatus determines whether the target document image recognized in step 200 represents the first format file (step 202). When the determination result is No, the information processing apparatus executes the processing recognized in step 200 on the second format (that is, PDF) file corresponding to the target document image (step 208).

When the determination result in step 202 is Yes, the information processing apparatus determines whether the processing recognized in step 200 corresponds to the above specific processing (step 204). When the determination result is No, the information processing apparatus executes the processing recognized in step 200 on the first format file corresponding to the target document image (step 206).

For example, when the recognized processing is processing of opening a file, the information processing apparatus starts an application corresponding to the first format by using information of the first format file corresponding to the target document image, and causes the application to open the file. At this time, the information processing apparatus may download the first format file stored in the own apparatus into an external predetermined storage region, for example, the desktop screen of the OS, and may cause the application to open the downloaded first format file.

On the other hand, when the determination result in step 204 is Yes, the information processing apparatus executes the processing recognized in step 200 on the second format file corresponding to the target document image (step 208). For example, when the execution of the bundling processing is instructed for the two selected icons 112 or the like, the information processing apparatus executes the bundling processing on the two second format files corresponding to the two icons 112 or the like.

The user may instruct the execution of the processing after selecting plural target document images. For example, after the user clicks and selects plural icons 112 or the like, a button in the operation button region 120 is pressed to instruct plural documents indicated by the plural icons 112 or the like to execute the processing corresponding to the button. Further, the operation of the user of dragging and dropping a certain icon 112 or the like to another icon 112 or the like is an operation of instructing the execution of the processing of bundling the two documents represented by the two icons 112 or the like. When the processing execution instruction is given to the plural target document images in this method, the information processing apparatus determines, for each of the plural target document images, whether the target document image is the first image indicating the first format file (step 202). Then, when the instructed processing corresponds to the specific processing (the determination result in step 204 is Yes), the information processing apparatus executes the processing using the second format files corresponding to each of the plural target document images (step 208).

On the other hand, when the instructed processing does not correspond to the specific processing (the determination result in step 204 is No), the information processing apparatus executes, by using the application corresponding to the first format file, the processing on a target document image representing the first format file among the plural target document images. Further, for the target document image representing the second format file, the processing is executed by using the second format file. For example, a case where the user selects the plural icons 112 or the like and drags and drops the plural icons 112 all at once onto the desktop screen is an example. In this example, for the target document image representing the first format (that is, the original format) file, only the first format file is fetched on the desktop screen (that is, the corresponding second format file is not fetched). On the other hand, for the target document image representing the second format file, the corresponding second format file is fetched on the desktop screen.

As described above, in the present exemplary embodiment, when the icons 112, 114, 118 and 119 representing the first format file are instructed to execute the basic processing that may be executed on the first format file, the processing is executed on the first format file. On the other hand, when those icons are instructed to execute the above specific processing that cannot be executed on the first format file, the specific processing is executed not on the first format file but on the corresponding second format file. Accordingly, depending on a type of processing instructed by the icons 112, 114, 118, and 119, it is switched to execute the processing on the first format file or the second format file.

Therefore, the user does not need to be aware of a difference in the file format for the basic processing such as opening regardless of whether the icon 112 or the like of the file is inside or outside (for example, inside the desktop screen of the OS) the handling screen 100 of the information processing apparatus. That is, for the basic processing, regardless of whether the icon 112 or the like is inside or outside the handling screen 100, the processing is performed by the application corresponding to the first format file represented by the icon 112 or the like. On the other hand, when the icon 112 or the like in the handling screen 100 is instructed to execute the specific processing that may be executed only by the second format file, the specific processing is executed using the second format file.

Further, as the thumbnail image 112a is associated with the second format file and the mark 112b is associated with the first format file, a method of switching a processing target depending on a pointed (that is, pointed by a mouse or the like) place in the icon 112 is also conceivable, but the present exemplary embodiment is different from the method.

That is, in the method, when the thumbnail image 112a is selected by a mouse operation or the like, the processing is executed on the second format file, and when the mark 112b is selected, the processing is executed on the first format file. On the other hand, in the present exemplary embodiment, whether the processing is performed on the first format file or the second format file does not depend on which part in the icon 112 is operated by the mouse or the like, but exclusively depends on the type of the processing instructed to be executed. Therefore, no matter which part of the icon 112 or the like is pointed by the user, if the type of the processing instructed to be executed by the user is the same, the file in the same format corresponding to the type is selected as the processing target.

<Bundling Processing>

Next, a more detailed description will be given for each processing corresponding to the specific processing. First, a detailed example of the bundling processing will be described.

The bundling processing is processing of combining plural documents selected in the workspace region 110 into one document. The bundling processing may be executed by, for example, the following three methods for the display in the workspace region 110. (1) The bundling processing is executed from a "bundling" button in an operation menu or a tool bar (the above operation button region 120 is an example). For example, by selecting the icons 112 or the like of plural documents in the workspace region 110 and then pressing the "bundling" button, the bundling processing is executed for the plural documents. (2) On the workspace region 110, the icon 112 or the like of the selected document is dragged and dropped to the icon 112 or the like of the document to be bundled. (3) The "bundling" is selected from the context menu that is called by an operation such as right-clicking.

When the documents to be bundled are all the documents in the second format (that is, PDF in this example), the document after executing the bundling processing is an upgraded version of the first document and is overwritten on the first document. Documents other than the first document among the documents to be bundled are deleted and moved to a storage region of the deleted file (a so-called trash can). The first document is the document selected first when the icons 112 or the like of the documents to be bundled are sequentially selected on the workspace region 110.

When the documents to be bundled include a document in the data format other than the second format (that is, a document in the first format), the processing procedure branches into the following two cases depending on whether the first document to be bundled is in the first format or the second format. (A) When the first document is in the second format, the information processing apparatus upgrades (that is, overwrites) the first document with the bundled documents, and leaves all the original documents to be bundled as they are. (B) When the first document format is the first format, the information processing apparatus generates and stores the bundled documents as new documents, while leaving all the original documents to be bundled as they are.

When the documents to be bundled include a document in a format other than the second format, the information processing apparatus notifies the user that the document in the second format is generated from the document. The notification is displayed on the handling screen 100 in a form of a message such as "the document after executing the processing is newly generated as a PDF document. The original file remains." Further, when the internal generation of the second format document fails, an execution error will occur.

During the execution of the bundling processing, the information processing apparatus locks the system for all the documents to be bundled. During the system lock, all users, including the user who instructed to execute the bundling processing, cannot operate those documents until the end of the processing. The system lock is released when the bundling processing is completed.

When there is at least one user-locked document in the documents to be bundled, and when the documents are bundled by overwriting, the user lock is maintained for the bundled documents. When bundling is performed by new generation, the user lock is not applied to the documents after bundling.

The bundling processing proceeds as follows, for example, on the display of the handling screen 100.
(When Executing from the "Bundling" Button or Selecting "Bundling" from the Context Menu)

The user selects the icon 112 or the like of the plural documents to be bundled on the workspace region 110. The selected icon 112 or the like is highlighted, and the numbers 1, 2, and 3 indicating a selection order are superimposed and displayed on the icon 112 or the like (see FIG. 3). After that, when the user performs operations of pressing the "bundling" button or selecting the "bundling" in the context menu, the information processing apparatus executes the bundling processing on the selected documents. By executing the bundling processing, the documents with the number 1 document as the first document are combined in an order of the above selection order to form one document.
(Execution by Dragging and Dropping Documents)

The user selects one or the plural icons 112 or the like of the documents to be bundled. Correspondingly, the one or more selected icons 112 or the like are highlighted, and numbers 1, 2, 3, . . . indicating the selection order are displayed on the icons 112 (see FIG. 3). When the one or more icons 112 or the like selected in this way are dragged and dropped with respect to the icon 112 or the like of the document to be bundled, the bundling processing is executed for plural documents including one or more selected documents and drag-and-drop destination documents. When the bundling processing is executed, the documents are combined in the above selection order. Then, the drag-and-drop destination documents are combined at the end.

The information processing apparatus determines a file name of the document (that is, the document after bundling) generated as a result of the bundling processing, for example, as follows.

That is, when the first document to be bundled is a second format document, the bundled document inherits the file name of the first document. On the other hand, when the first document is not in the second format, in order to avoid having the same name as the first document, in the new document generated as a result of bundling, a character string, in which a serial number having a predetermined number of digits is added as a suffix after the file name of the first document, is added as the file name. For example, when the file name of the first document is "example.doc", the file name of the new document after bundling is "example-00001.pdf".

During the execution of the bundling processing, the information processing apparatus may display the progress of the bundling processing in association with the icon 112 or the like of at least one document to be bundled. The display may be performed, for example, in a form of an activity indicator (for example, a bar display indicating a progress ratio) or in a form of a numerical display of the number of processed pages with respect to a total number of pages.

When there is an attached file attached to a main body of each document to be bundled (that is, an attached file for the entire document), the information processing apparatus integrates the attached files as an attached file of the main body of the bundled document. On the other hand, the attached file attached to any page of any of the documents to be bundled remains as an attached file for the page of the bundled document.

As for attributes of documents, that is, files, when the first document to be bundled is in the second format, since the bundled document is overwritten by the first document, the attributes of the first document may be inherited by the bundled document. In this case, the information processing apparatus may notify the user that the bundled document inherits the attributes of the first document and request confirmation before starting the bundling processing. For this purpose, for example, a message such as "when plural documents are to be bundled, only the attributes of the first selected document remain and the attributes of the other documents are discarded. Are you sure you want to bundle the documents as they are?" may be displayed on the handling screen 100. The attributes of the file referred to here may include custom attributes defined by the user in addition to general document attributes such as a title, an author, a subtitle, a keyword, or the like.

FIGS. 4A to 4D illustrate four typical patterns of the bundling processing described above. A design of a document 400 or the like shown in this figure schematically shows a design of an icon of the document on the workspace region 110.

The pattern illustrated in FIG. 4A shows a case where an instruction is given to bundle the two documents 400 and 402 in the second format (PDF format in this example) in this order. It is assumed that the documents 400 and 402 are both documents having one page, and the document 402 has an attached file attached to the entire document. The presence of the attached file is indicated by a gem clip mark 404 on the icon of document 402. As a result of the bundling processing, a document 406 in the second format is generated, and the document is overwritten and stored in the document 400 which is the first document. Since the bundled document 406 is a document having two pages, a clip mark 408 indicating the presence of plural pages is attached to the icon of the document 406. The attached file of the document 402 is integrated into the bundled document 406 as an attached file of the entire document.

The pattern illustrated in FIG. 4B shows a case where an instruction is given to bundle a document 410 in the first format (in this example, a data format of the word processor) formed by one page and a document 412 in the second format also formed by one page in this order. In this case, a document 414 in the second format after bundling is generated as a new document, and the two documents 410 and 412 to be bundled remain in the information processing apparatus as they are. The document 414 is a document having two pages in which the first page is the document 410 and the second page is the document 412. Further, the document 410 in the first format is integrated with the bundled document 414 as an attached file of the entire document. The attached file is represented by a gem clip mark 416 for the icon of the document 414. When an operation of opening a predetermined file by double-clicking or the like is performed on the mark 416, the attached file is opened by an application corresponding to the first format.

The pattern illustrated in FIG. 4C shows a case where an instruction is given to bundle a document 420 in the second format formed by one page and a document 422 in the first format also formed by one page in this order. In this case, a bundled document 424 in the second format is stored in the information processing apparatus in a form of being overwritten by the document 420 in the second format, which is the first document. After the bundling processing, the overwritten document 420 disappears from the information processing apparatus (for example, the document 420 is moved to the trash can), but the document 422 in the first format among the documents to be bundled remains stored in the information processing apparatus. Further, the document 422 in the first format is integrated with the bundled document 424 as an attached file of the entire document.

The pattern illustrated in FIG. 4D shows a case where an instruction is given to bundle two documents 430 and 432 in the first format, each of which formed by one page, in this order. In this case, a document 434 in the second format after bundling is generated as a new document, and the two documents 430 and 432 to be bundled remain in the information processing apparatus as they are. The document 434 is a document having two pages in which the first page is the document 430 and the second page is the document 432. Further, the two documents 430 and 432 in the first format are integrated with the bundled document 434 as an attached file of the entire document.

Figure 5:
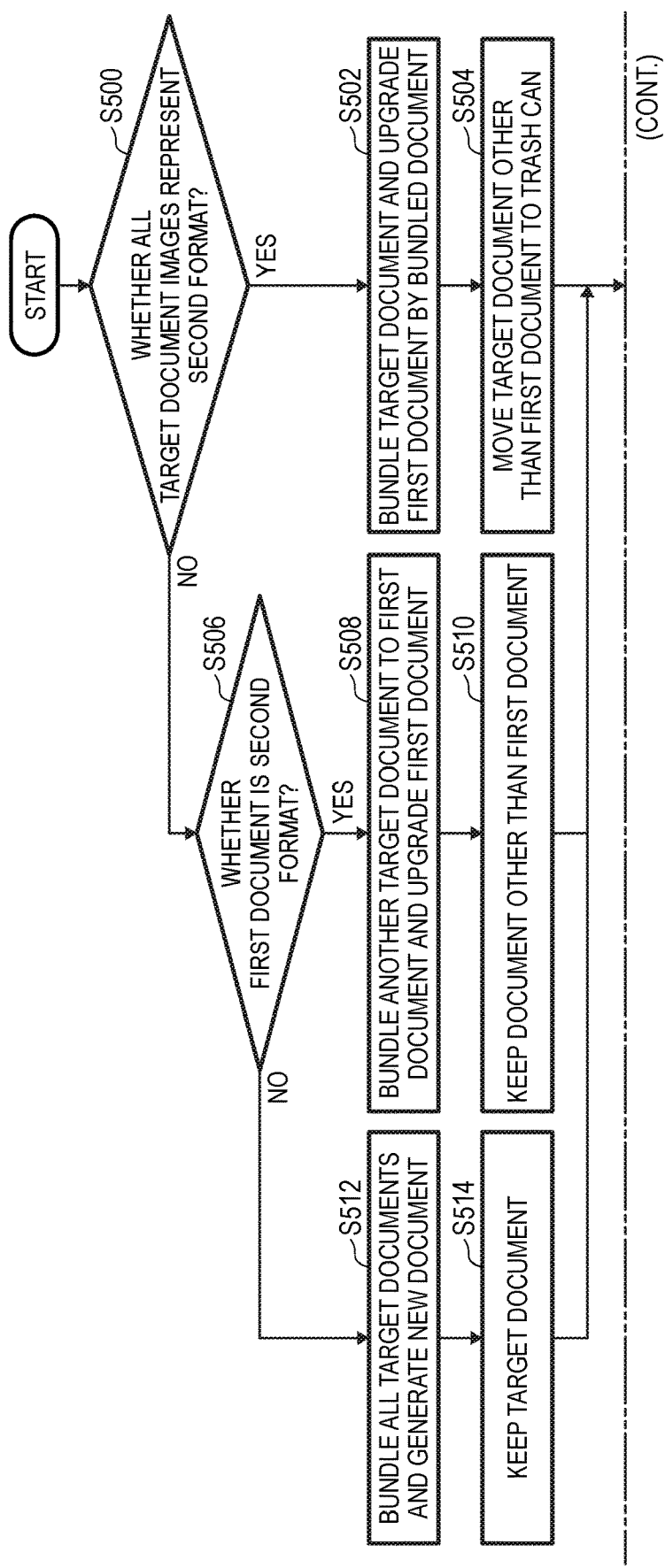
FIG. 5 is a diagram illustrating an overall processing procedure of the bundling processing.

FIG. 5 illustrates an overall processing procedure of such bundling processing. This procedure is started when the user selects one or more documents to be bundled on the handling screen 100 and instructs the execution of the bundling processing by a method such as pressing the bundling button. An image (that is, the icon 112 or the like) representing a document selected by the user as a document to be bundled is referred to as a target document image. Further, a document or a file represented by the target document image is also referred to as a target document. The target document is a document in the internal format or a file in the second format of the information processing apparatus. Further, plural target document images may be selected in order in the workspace region 110, and the execution of the processing may be instructed for the plural target document images, but in that case, a target document corresponding to the first selected target document image among the plural target document images is referred to as a first document.

When the execution instruction of the bundling processing is received, the information processing apparatus determines whether all the files represented by the target document image are files in the second format (PDF in this example) (step 500). This step is also included in the processing procedure of the present exemplary embodiment, and there is a step of determining whether the file represented by the target document image is in the second format (or the first format). The determination in these steps may be performed according to information included in the file (for example, included in the header information of the file) indicating the data format of the file.

When the determination result in step 500 is Yes, the information processing apparatus executes the processing of bundling the second format file of the target document corresponding to the target document image, and generates the bundled document. Then, the information processing apparatus upgrades the first document by the bundled document (step 502). Next, the information processing apparatus moves the target document other than the first document to the trash can (step 504).

When the determination result in step 500 is No, the information processing apparatus determines whether the first document is a second format file (step 506). When the determination result is Yes, the information processing apparatus executes the processing of bundling the second format file corresponding to the target document image, and upgrades the first document by the bundled document obtained as the result (step 508). The bundling processing is performed using a second format file corresponding to each target document image. Then, the information processing apparatus keeps the target document other than the first document stored (step 510). As a result of the bundling processing, a display content of the target document image representing the first document on the workspace region 110 may change due to version upgrade, but display contents of the other target document images do not change.

When the determination result in step 506 is No, the information processing apparatus executes the processing of bundling the second format files corresponding to all the target document images, and stores the bundled document obtained as the result as a new document (step 512). The bundling processing is performed using a second format file corresponding to each target document image. Then, the information processing apparatus keeps all the target documents stored (step 514). As a result of the bundling processing, a target document image, that is, an icon, indicating the new document of the bundling result is newly displayed on the workspace region 110. Further, each target document image selected as a target of bundling is displayed as it is without any change.

After steps 504, 510, or 514, the information processing apparatus determines for each target document image whether there is an attached file associated with the entire second format file corresponding to the target document image (step 516). When there is an attached file associated with the entire second format file corresponding to the target document image, the attached file is associated with the first document after bundling (that is, the attached file is integrated with the first document) (step 518). The new document generated in step 512 also corresponds to the first document referred to in step 518 and step 522 described later. For example, when attached files a1 and a2 are associated with an entire second format file A corresponding to the target document image, and an attached file b is associated with an entire second format file B corresponding to the target document image, in step 518, these three attached files a1, a2, and b are associated with the first document. When the determination result in step 516 is No, step 518 is skipped.

Next, the information processing apparatus determines for each target document image whether there is an attached file associated with a page of the second format file corresponding to the target document image (step 520). When the determination result is Yes, the information processing apparatus associates the attached file associated with the page of the second format file corresponding to the target document image with the page in the first document (step 522). When the determination result in step 520 is No, step 522 is skipped.

Figure 6:
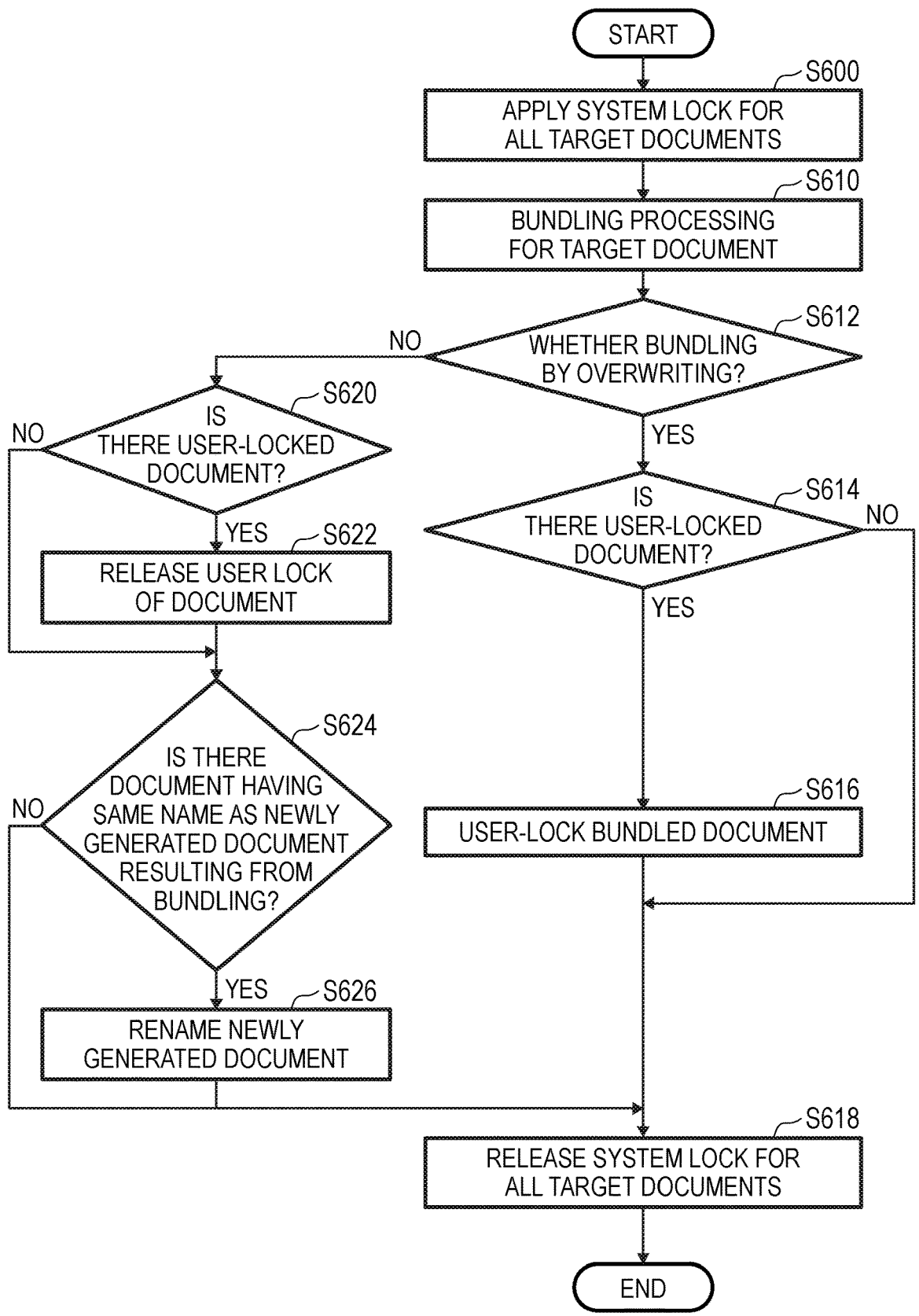
FIG. 6 is a diagram illustrating a procedure of lock control in specific processing.

Next, with reference to FIG. 6, a detailed procedure of steps 502, 508, and 512 (that is, processing of actually bundling plural files) in the procedure of FIG. 5, particularly a procedure including lock control (that is, exclusive control) will be illustrated.

As shown in FIG. 6, when the information processing apparatus starts bundling the second format files corresponding to the target document images, first, system lock is applied to the files (the files in the first format and the second format) corresponding to all the target document images (step 600). Accordingly, all the target document images (and the target documents represented by the target document images) cannot be operated by all users. Instead of making the target document image completely inoperable, editing may not be allowed but reference may be allowed. After the system lock, the information processing apparatus executes the bundling processing for the second format files corresponding to the target document images in a form corresponding to each of steps 502, 508, and 512 (step 610).

Next, the information processing apparatus determines whether the bundling processing executed in step 610 is bundling by overwriting (that is, version upgrade of the first document) (step 612). The determination result is Yes in a case of steps 502 and 508, and is No in a case of step 512.

When the determination result in step 612 is Yes, the information processing apparatus determines whether there is a user-locked file in the files corresponding to the target document images (step 614). A user-locked document may be edited by a user who uses the user lock, but cannot be edited by other users. When the determination result in step 614 is Yes, that is, when there is at least one user-locked document in the files corresponding to the target document images, the information processing apparatus performs user lock on the bundled document (step 616). When there are no user-locked documents, the bundled documents cannot be user-locked. Then, the information processing apparatus releases the system lock for the files corresponding to all the target document images (step 618).

When the determination result in step 612 is No, the information processing apparatus determines whether there is a user-locked file in the files corresponding to the target document images (step 620). When the determination result in step S620 is Yes, the information processing apparatus releases the user lock from the file corresponding to the target document image to which the user lock is applied (step 622). When there are no user-locked documents, step 622 is skipped.

When the determination result in step 612 is No, the information processing apparatus checks whether there is a document having the same name as the bundled document (in this case, a newly generated document) in the second format file corresponding to the target document image (step 624), and when the determination result is Yes, the bundled document is renamed according to a predetermined rule (step 626). For example, when the bundled document is set to inherit the file name of the first document in the second format file corresponding to the target document image, the determination result in step 626 is Yes, and the file name of the bundled document is renamed. The renaming rule may be, for example, a rule of adding a suffix of a serial number having a predetermined number of digits to a document name before renaming. When the determination result in step 624 is No, step 626 is skipped. Then, the information processing apparatus releases the system lock for the files corresponding to all the target document images (step 618).

After step 618, the information processing apparatus proceeds to step 516 of the procedure of FIG. 5.

<Disassembling Processing>

Next, a detailed example of the disassembling processing will be described.

The disassembling processing is processing of dividing one document selected in the workspace region 110 into several documents in response to a designation of the user. The disassembling processing is also referred to as dividing processing.

The information processing apparatus provides a disassembled screen for UI of the disassembling processing. The screen is called by the user selecting the icon 112 or the like which is the target document image in the workspace region 110, pressing the "disassembling" (or "dividing") button from the operation menu or the toolbar, or selecting the "disassembling" from the context menu.

A result after executing the "disassembling processing" may be selected from the following two cases by selecting an option in the "disassembled screen". (A) The second format file corresponding to the target document image is overwritten with the first document after dividing (disassembling). (B) All the divided documents are newly generated without changing the second format file corresponding to the target document image.

When the target document image for the disassembling processing is an image representing a file in a format other than the second format (in other words, an image representing a file in the first format), the above option selection is invalid, and the processing result of (B) is automatically selected. At this time, the user is notified of a message that the document is converted to the second format (PDF in this example). The message may be, for example, "the document after the processing is executed is newly generated as PDF." Further, when the internal conversion to the second format fails, an execution error will occur.

While the disassembled screen is being displayed, the file corresponding to the target document image to be disassembled is locked by the user during operation. When another user is locking the file corresponding to the target document image, the disassembling processing cannot be executed. Further, the user lock is released when the "disassembled screen" is closed. During the execution of the disassembling processing, the system lock is performed on the file corresponding to the target document image to be disassembled. When the system lock is performed, all users including the user who starts the operation cannot operate the target document image until the disassembling processing is completed. The system lock is released when the disassembling processing is completed. When there is a user-locked document in the file corresponding to the target document image and the disassembling is performed by overwriting, the first document after disassembling maintains the user lock. However, the user lock is not applied to the newly generated document as a result of the disassembling.

The disassembling processing proceeds, for example, as follows on the display of the handling screen 100.

When the user selects the document to be disassembled on the workspace region 110 and performs an operation such as pressing the "disassembling" button or selecting the "disassembling" in the context menu, the information processing apparatus displays a disassembled screen. The disassembling is processing that may be performed only for one document having plural pages. When plural documents are selected, the disassembling function will be disabled.

Figure 7:
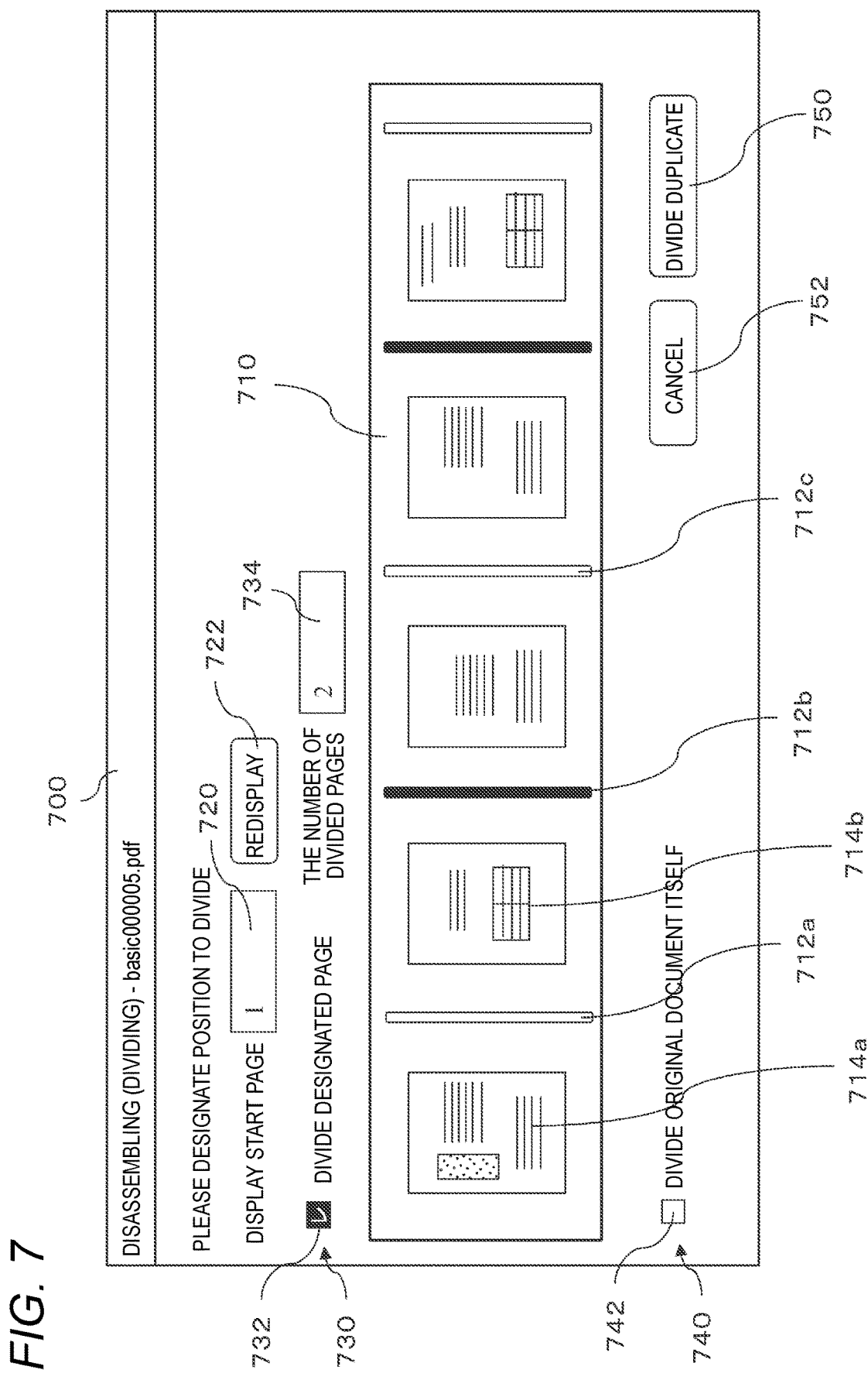
FIG. 7 is a diagram illustrating a disassembled screen.

FIG. 7 illustrates a disassembled screen 700. The disassembled screen 700 includes a thumbnail section 710 that displays thumbnail images 714a, 714b, . . . of each page of the second format file corresponding to the target document image of the disassembling processing. In a display start page designation section 720, the number of a page on which the thumbnail display is started is input. An initial value of the page number at starting of the display is 1, and when the disassembled screen 700 is displayed for the first time, in the thumbnail section 710, the thumbnail images 714a, 714b, . . . of the first page, the second page, the third page, . . . of the second format file corresponding to the target document image are displayed in order from the left. When the user wants to start the display from a later page, the user inputs a page number from which the display to be started in the display start page designation section 720 and presses a redisplay button 722. Correspondingly, in the thumbnail section 710, thumbnail images of consecutive pages are displayed in order from a designated start page. Division position marks 712a, 712b, 712c, . . . are displayed between the thumbnail images 714a, 714b, . . . of adjacent pages in the thumbnail section 710. The division position mark 712a or the like takes one of two states, on and off. The document is divided at a position such as the division position mark 712a in the on state. In the illustrated example, the white division position marks 712a and 712c are in the off state, and the black-painted division position marks 712b are in the on state. The on and off of the division position mark 712a or the like may be switched by a clicking operation or the like using the mouse.

An item 730 is used when instructing division in a mode of "dividing by designated pages". When a check section 732 is turned on (that is, a state in which a check mark is entered) by operating the mouse or the like, the mode is turned on. When the mode is on, the information processing apparatus divides the second format file corresponding to the target document image by the number of pages input by the user in a divided page number section 734. In the example of FIG. 7, the mode is on and the number of divided pages is designated as 2. In response to the designation, in the thumbnail section 710, the division position mark 712b located at positions of two pages from the beginning is in the on state.

Accordingly, the division position of the document on the disassembled screen 700 may be designated by the following two methods. ($\alpha$) The division position mark 712a or the like is clicked on the thumbnail section 710 (the mark is toggled on and off each time the division position mark 712a is clicked). ($\beta$) The check section 732 of the item 730 ("divided by page") is turned on, and the number of pages in the divided page number section 734 is designated.

It is also possible to re-edit the state of each division position mark 712a by the method ($\alpha$) after turning on the division position mark 712a at a designated page number interval by the method ($\beta$).

An item 740 is used when instructing division in a mode of "dividing the original document itself". When a check section 742 is turned on by operating the mouse or the like, the mode is turned on. When the mode is on, the information processing apparatus divides the second format file itself corresponding to the target document image of the disassembling processing selected in the workspace region 110. In this case, the second format file corresponding to the target document image stored in the information processing apparatus is overwritten by the first document among plural documents generated as a result of the division. On the other hand, when the mode is off, the information processing apparatus generates a duplicate of the second format file corresponding to the target document image and divides the duplicate. In this case, all of the plural documents resulting from the division are stored as new documents in a file system of the information processing apparatus.

In the illustrated example, the mode of "dividing the original document itself" is off, and therefore, a start button 750 instructing the start of the disassembling (dividing) processing displays "dividing the duplicate". Conversely, when the mode is on, the start button 750 displays "divide".

When the target document image represents a first format file, the mode of "dividing the original document itself" cannot be selected, and the mode of dividing the duplicate is automatically selected.

When at least one of the division position marks 712a or the like is in the on state, the start button 750 instructing the start of the disassembling processing is valid, that is, becomes depressible. When the start button 750 is clicked, the disassembling processing is executed, and accordingly, the display of the disassembled screen 700 ends. The workspace region 110 to be displayed as a result is updated to a state showing the result of the disassembling processing. That is, an icon indicating a new document generated as a result of the disassembling is added to the workspace region 110.

When a cancel button 752 is pressed, the disassembled screen 700 is closed without executing the disassembling processing.

When the display of the disassembled screen 700 is ended, the document locked for the disassembling processing is unlocked (that is, the lock is release).

The information processing apparatus determines the file name of the document generated as the result of the disassembling processing, for example, as follows.

When the second format file corresponding to the target document image is overwritten with the first document resulting from the disassembling, the first document inherits the original document name, that is, the document name of the file corresponding to the target document image, and the second and subsequent documents have branch numbered document names according to a same name avoidance rule. For example, the document name is obtained by adding a hyphenated suffix having a predetermined number of digits to the end of the original document name.

When all the documents resulting from the disassembling processing are newly generated without overwriting the second format file corresponding to the target document image, a branch numbered document name is obtained according to the same name avoidance rule.

The information processing apparatus may display a progress status of the processing in association with the target document image during the execution of the disassembling processing. The display may be performed, for example, in a form of an activity indicator or in a form of a numerical display of the number of processed pages with respect to a total number of pages.

When there is an attached file attached to the main body of the second format file corresponding to the target document image of the disassembly processing, the attached file is attached to the document, among the documents resulting from the disassembling, including a first page of the second format file corresponding to the target document image. The attached file associated with each page of the second format file corresponding to the target document image is inherited in a state associated with the same page of each document resulting from the disassembling.

Attributes of the file corresponding to the target document image are inherited by all the documents resulting from the disassembling.

FIGS. 8A to 8C illustrate three typical patterns of the disassembling processing described above.

A pattern illustrated in FIG. 8A shows a case where a document 800 in the second format having two pages with an attached file is instructed to be disassembled page by page by an overwrite method (that is, the mode of "dividing the original document itself"). In this case, as a result of the disassembling, documents 802 and 804 in the second format having one page are generated, and the document 802 is overwritten by the document 800. Further, the attached file is inherited by the first document 802.

A pattern illustrated in FIG. 8B shows a case where an instruction is given to disassemble a document 810 in the first format (for example, the data format of the word processor), which has two pages, page by page. In this case, in the disassembling processing, a document in the second format included in the document 810 is divided page by page, and documents 812 and 814 in the second format having one page are newly generated. Further, the original document 810 keeps stored in the information processing apparatus.

A pattern illustrated in FIG. 8C shows a case where an instruction is given to disassemble a document 820 in the second format, which has two pages with an attached file, page by page by remaining the original document. In this case, as a result of the disassembling, documents 822 and 824 in the second format having one page are generated, and the original document 820 also remains. The attached file is also attached to the first document 822 of the disassembling result.

Figure 9:
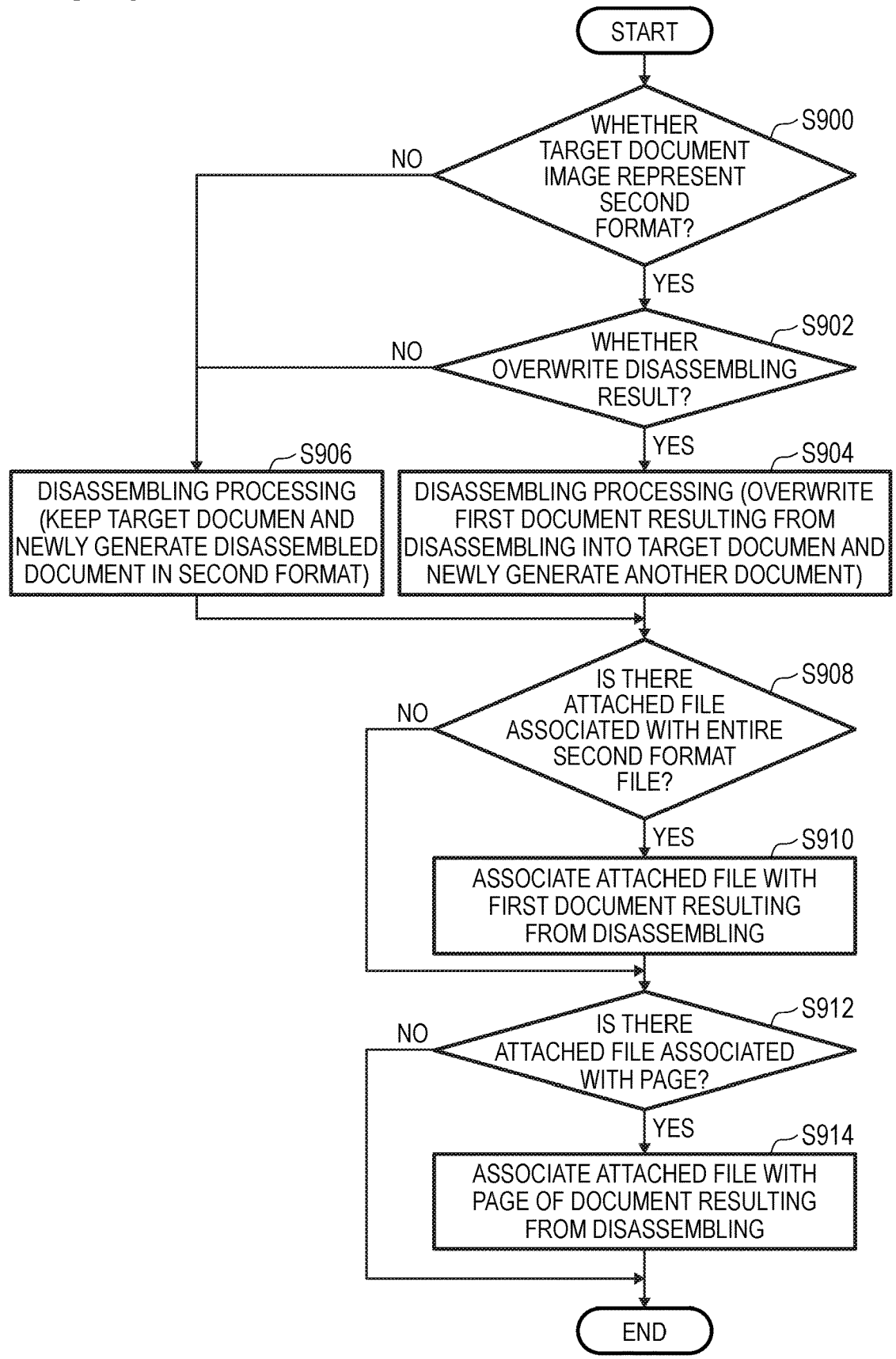
FIG. 9 is a diagram illustrating an overall processing procedure of the disassembling processing.

FIG. 9 illustrates an overall processing procedure of such disassembling processing. The procedure is started when the user presses the start button 750 on the disassembled screen 700 to instruct the execution of the disassembling processing.

When the execution instruction of the disassembling processing is received, the information processing apparatus determines whether the target document image represents a file in the second format (PDF in this example) (step 900). In the determination, when the target document image corresponds to the first format file in addition to the second format file, it is determined that the target document image does not represent a second format file. On the other hand, the target document image that corresponds to the second format file but does not correspond to the first format file is determined to represent a second format file.

When the determination result in step 900 is Yes, the information processing apparatus further determines whether a setting of overwriting the result of the disassembling processing is prepared (that is, "dividing the original document itself" is selected) (step 902). Next, the information processing apparatus disassembles the second format file corresponding to the target document image according to the instruction on the disassembled screen 700, overwrites and stores the first document resulting from the disassembling into the second format file corresponding to the target document image, and generates and stores the other documents resulting from the disassembling as new documents (step 904).

When the determination result in step 900 is No, the information processing apparatus newly generates and stores each document resulting from the disassembling (step 906).

After step 904 or 906, the information processing apparatus determines whether there is an attached file associated with the entire second format file corresponding to the target document image (step 908). When the determination result is Yes, the attached file is associated with the first document resulting from the disassembling (step 910). When the determination result in step 908 is No, step 910 is skipped.

Next, the information processing apparatus determines whether there is an attached file associated with a page of the second format file corresponding to the target document image (step 912). When the determination result is Yes, the information processing apparatus associates the attached file associated with the page of the second format file corresponding to the target document image with a page corresponding to the page in each document resulting from the disassembling (step 914). When the determination result in step 912 is No, step 912 is skipped.

Since a specific procedure for controlling a lock on the file corresponding to the target document image in steps 904 and 906 in the procedure of FIG. 9 may be similar to a procedure for controlling a lock in the bundling processing shown in FIG. 6, the description is omitted.

<Annotation Processing>

Annotation processing in which the information processing apparatus associates with annotation information of the second format file is also an example of specific processing. For example, the annotation processing will be described by taking as an example the stamping processing using the approval stamp button 124 on the handling screen 100 illustrated in FIG. 1.

When the user selects the target document image on the workspace region 110 and presses the approval mark button 124, the information processing apparatus opens a second format file corresponding to the target document image, and superimposes an image of an imprint on the approval stamp stored in advance at a predetermined place on a predetermined page of the file.

Here, when the target document image represents a first format file, since the target document image is also associated with a second format file generated from the first format file, the information processing apparatus superimposes the image of the imprint on the second format file. The information processing apparatus updates the second format file itself associated with the target document image to a version on which the image of the imprint is superimposed. Further, as another example, the information processing apparatus may generate and store a new second format file of a version on which the image of the imprint is superimposed. In this example, an image or icon representing the newly generated second format file is newly displayed on the workspace region 110. Further, as another example, the user may optionally be able to set whether to update the second format file itself associated with the target document image or to generate a new second format file.

Figure 10:
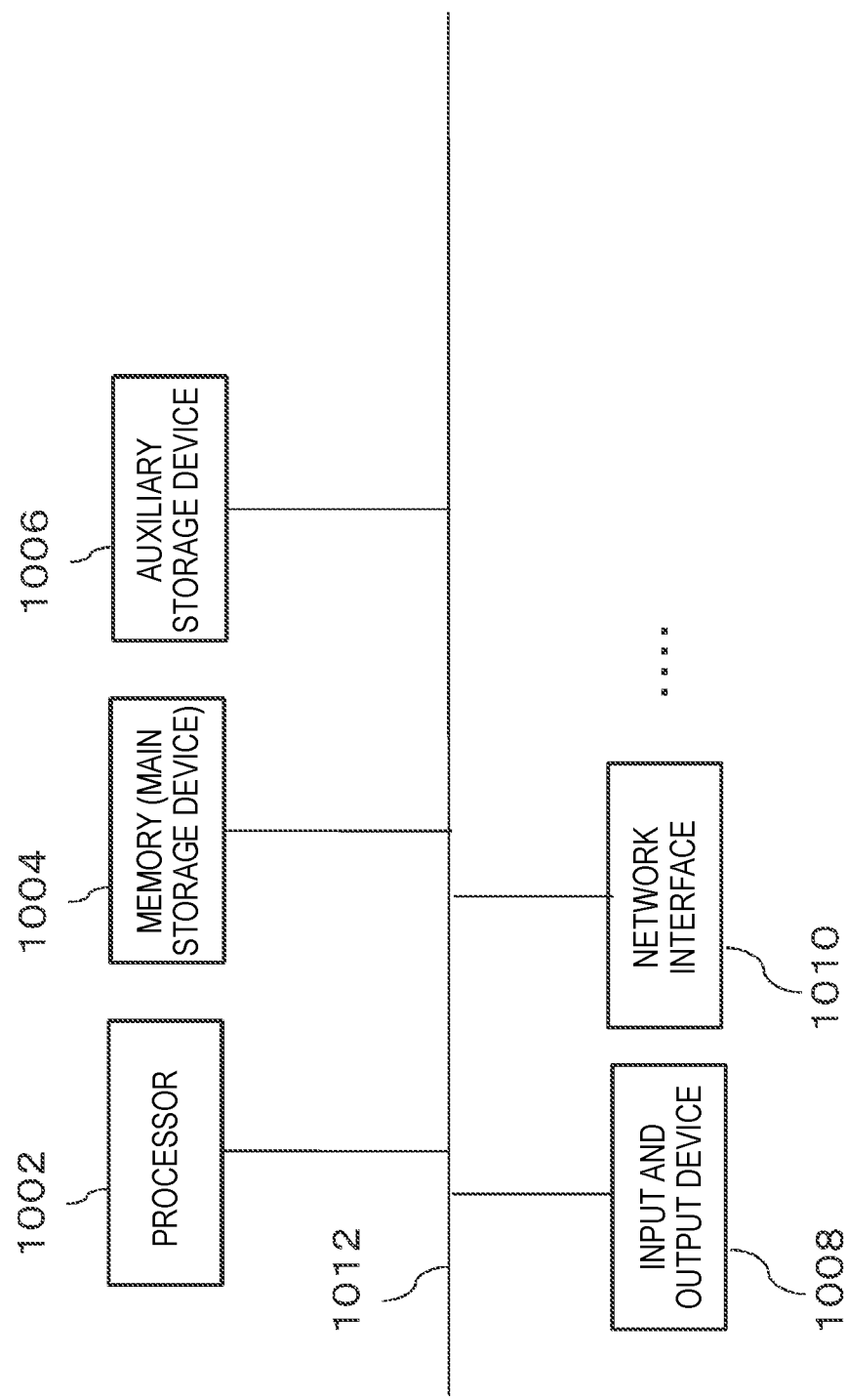
FIG. 10 is a diagram illustrating a hardware configuration of a computer.

The information processing apparatus of the above exemplary embodiment is configured by using, for example, a general-purpose computer. As illustrated in FIG. 10, the computer that is a base of the information processing apparatus includes a circuit configuration in which a controller that controls a processor 1002, a memory (main storage device) 1004 such as a random access memory (RAM), and an auxiliary storage device 1006, which is a non-volatile storage device such as a flash memory, a solid state drive (SSD), or a hard disk drive (HDD), interfaces with various input and output devices 1008, a network interface 1010 that controls connection with networks such as a local area network, or the like are connected via a data transmission line such as a bus 1012 or the like. A program in which the contents of the processing of the above exemplary embodiment are described is installed in the computer via a network or the like and stored in the auxiliary storage device 1006. The information processing apparatus of the present exemplary embodiment is configured by the processor 1002 executing the program stored in the auxiliary storage device 1006 using the memory 1004.

In the above-described exemplary embodiments, the term "processor" refers to hardware in a broad sense. Examples of the processor include general processors (for example, CPU: central processing unit) and dedicated processors (for example, GPU: graphics processing unit, ASIC: application specific integrated circuit, FPGA: field programmable gate array, and programmable logic device).

In the above-described exemplary embodiments, the term "processor" is broad enough to encompass one processor or plural processors in collaboration which are located physically apart from each other but may work cooperatively. The order of operations of the processor is not limited to one described in the exemplary embodiments above, and may be changed as appropriate.

Further, in the above exemplary embodiment, as a file or a document to be subjected to specific processing, a file generated by a word processor or spreadsheet software is mainly shown, but the above is only an example. In addition to these files or documents, the file or document to be processed in the above exemplary embodiment may include, for example, a file including a moving image or multimedia data.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process, the process comprising:
    obtaining a file of a first format on which specific processing cannot be executed;
    generating a file of a second format on which the specific processing is executable based on the obtained file of the first format before execution of the specific processing is instructed; and
    executing the specific processing on the generated file of the second format in response to an instruction to a first image representing the file of the first format to execute the specific processing,
    wherein the process comprises
        displaying, in a case where a file of the second format is obtained, a second image representing the file of the second format, and
        executing the specific processing, in response to an instruction to a plurality of images including the first image and the second image and representing different files to execute the specific processing, on a file of the second format generated based on a file of the first format before the instruction for the file of the first format among the files represented by the plurality of images, and on a file of the second format for the file of the second format among the files represented by the plurality of images.

2. The non-transitory computer readable medium according to claim 1, wherein
    the process comprises executing another processing different from the specific processing on the file of the first format in response to an instruction to the first image to execute the another processing, the another processing being executable on the file of the first format.

3. The non-transitory computer readable medium according to claim 1, wherein
    the program causes the computer not to display a second image representing the generated file of the second format.

4. The non-transitory computer readable medium according to claim 2, wherein
    the program causes the computer not to display a second image representing the generated file of the second format.

5. The non-transitory computer readable medium according to claim 1, wherein
    the specific processing is processing of combining a plurality of files to generate a new file of the second format.

6. The non-transitory computer readable medium according to claim 2, wherein
    the specific processing is processing of combining a plurality of files to generate a new file of the second format.

7. The non-transitory computer readable medium according to claim 3, wherein
    the specific processing is processing of combining a plurality of files to generate a new file of the second format.

8. The non-transitory computer readable medium according to claim 4, wherein
the specific processing is processing of combining a plurality of files to generate a new file of the second format.

9. The non-transitory computer readable medium according to claim 5, wherein
the process comprises attaching the file of the first format represented by the first image among the plurality of files to the new file of the second format generated as a result of the specific processing.

10. The non-transitory computer readable medium according to claim 6, wherein
the process comprises attaching the file of the first format represented by the first image among the plurality of files to the new file of the second format generated as a result of the specific processing.

11. The non-transitory computer readable medium according to claim 7, wherein
the process comprises attaching the file of the first format represented by the first image among the plurality of files to the new file of the second format generated as a result of the specific processing.

12. The non-transitory computer readable medium according to claim 8, wherein
the process comprises attaching the file of the first format represented by the first image among the plurality of files to the new file of the second format generated as a result of the specific processing.

13. The non-transitory computer readable medium according to claim 1, wherein
the specific processing is processing of dividing a single file into a plurality of files to generate a plurality of files of the second format.

14. The non-transitory computer readable medium according to claim 1, wherein
the specific processing is processing of generating an annotated file of the second format.

15. The non-transitory computer readable medium according to claim 1, wherein
the process comprises displaying an image representing the generated file of the second format as a result of the specific processing while the first image representing the file of the first format is displayed.

16. A non-transitory computer readable medium storing a program causing a computer to execute a process, the process comprising:
obtaining a file of a first format on which specific processing cannot be executed;
generating a file of a second format on which the specific processing is executable based on the obtained file of the first format before execution of the specific processing is instructed; and
executing the specific processing on the generated file of the second format in response to an instruction to a first image representing the file of the first format to execute the specific processing
wherein the process comprises:
executing another processing different from the specific processing on the file of the first format in response to an instruction to the first image to execute the another processing, the another processing being executable on the file of the first format,
displaying, in a case where a file of the second format is obtained, a second image representing the file of the second format, and
executing the another processing, in response to an instruction to a plurality of images including the first image and the second image and representing different files to execute the another processing, on a file of the first format for the file of the first format among the files represented by the plurality of images, and on a file of the second format for the file of the second format among the files represented by the plurality of images.

17. A method of processing a file, comprising:
obtaining a file of a first format on which specific processing cannot be executed;
generating a file of a second format on which the specific processing is executable based on the obtained file of the first format before execution of the specific processing is instructed; and
executing the specific processing on the generated file of the second format in response to an instruction to a first image representing the file of the first format to execute the specific processing,
wherein the method comprises
displaying, in a case where a file of the second format is obtained, a second image representing the file of the second format, and
executing the specific processing, in response to an instruction to a plurality of images including the first image and the second image and representing different files to execute the specific processing, on a file of the second format generated based on a file of the first format before the instruction for the file of the first format among the files represented by the plurality of images, and on a file of the second format for the file of the second format among the files represented by the plurality of images.

* * * * *